United States Patent Office 3,636,143
Patented Jan. 18, 1972

3,636,143
O-(2 - NITRO - 4 - ALKYL-PHENYL)-O-ALKYL-N-ISOPROPYL-AMIDO-PHOSPHOROTHIOATES
Gerhard Schrader, Wuppertal-Cronenberg, and Ludwig Eue and Helmuth Hack, Cologne, Germany, and Seiichi Hirane, Masahiro Aya, Shigeo Kishino, and Nobuo Fukazawa, Tokyo, Japan, assignors to Farbenfabriken Bayer Aktiengesellschaft, Leverkusen, Germany
No Drawing. Filed Nov. 7, 1969, Ser. No. 874,954
Int. Cl. A01n 9/36; C07f 9/24
U.S. Cl. 260—954                                    9 Claims

ABSTRACT OF THE DISCLOSURE

O-(2-nitro - 4 - alkyl - phenyl) - O - alkyl - N - isopropyl-amido-phosphorothioates, which possess herbicidal properties.

---

The present invention relates to certain new amidothionophosphoric acid esters, to a process for their production and to their use as herbicides.

The compounds of the present invention are O-(2-nitro-4-alkylphenyl) - O - alkyl N-isopropylphosphoroamidothioates, of the following general formula:

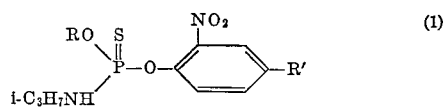
(1)

wherein:

R and R' are each an alkyl radical having 1–4 carbon atoms.

It is already known that amidothionophosphoric acid esters of the following general formula possess insecticidal and fungicidal activities (British patent specification No. 659,862):

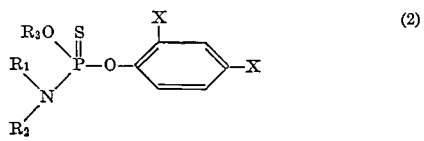
(2)

wherein $R_3$ is an alkyl or alkenyl radical,
$R_1$ is an alkyl radical,
$R_2$ is an alkyl radical or a hydrogen atom,
one X is a nitro radical and the other X is a hydrogen atom or a nitro radical.

The above British patent specification indicates only that these compounds have insecticidal and acaricidal effectiveness and are also effective for the control of harmful fungi on plants and can be used as spraying preparations. There is no indication that these compounds have any herbicidal activity. There is also no mention of any applicability to soil or any indication that one might expect them to have herbicidal activity.

Compounds of U.S. Pat. No. 3,074,790, for example O-(2,4-dichlorophenyl) - O - methyl N-isopropylphosphoroamidothioate, have herbicidal properties, and the present inventors have investigated the herbicidal activity of various derivatives of these amidothionophosphoric acid esters and have discovered that the compound of the following structure has particularly excellent herbicidal efficacy (Japanese patent application No. 78,104/66):

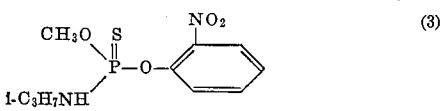
(3)

It was most surprising to find that the compounds of Formula 1, which may be considered as derivatives of the compound of Formula 3 substituted by an alkyl radical, in the para-position, are excellent herbicides. Especially when a pre-emergence application is made, they show remarkably excellent effective in killing weeds and yet they do not appear to have any phytotoxicity to cultivated plants.

It is preferred that R' be a methyl radical. Preferred compounds therefore have the formula:

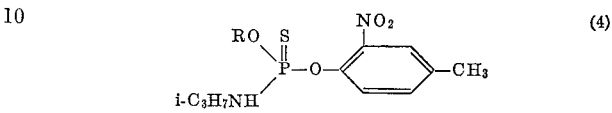
(4)

As mentioned above, the present invention is based on the discovery that the compounds of Formula 1 show remarkably excellent herbicidal efficacy when used as herbicide and especially when applied to soil before germination. This is particularly surprising, since they are inferior to the known compounds having analogous structure in insecticidal and fungicidal properties.

The invention also provides herbicidal compositions containing the amidothionophosphoric acid esters of general Formula 1 as active ingredient in admixture with a solid diluent or carrier or in admixture with a liquid diluent or carrier containing a surface active agent. The invention also provides a method of combating weeds which comprises applying to the weeds or a weed habitat an amidothionophosphoric acid ester of the Formula 1 alone or in admixture with a solid or liquid diluent or carrier, especially to soil before germination.

The compounds of the present invention are distinguished by their lack of phytotoxicity to rice plants and by the small amounts (compared with pentachlorophenol (PCP) and 2,4 - dichlorophenyl - 4' - nitrophenyl ether (NIP) etc.) are needed to give good results in paddy fields. A similar effect to that of Simazin may be expected without harm to cultivated plants when the active compound is applied to soil before germination for the purpose of controlling weeds in upland fields. Especially when applied to soil before germination, the active compounds of the invention are better than certain previous herbicides in that they show a superior selective herbicidal activity depending on the amount applied.

Table I contains examples of the compounds to be used in this invention.

TABLE I

| Structural formula | Chemical name |
|---|---|
| $CH_3O$—, $S$, $i$—$C_3H_7NH$, P—O—(phenyl-$NO_2$)—$CH_3$ (5) | O-(2-nitro-4-methylphenyl) O-methyl N-isopropylphosphoro-amidothionate. |
| $C_2H_5O$—, $S$, $i$—$C_3H_7NH$, P—O—(phenyl-$NO_2$)—$CH_3$ (6) | O-(2-nitro-4-methylphenyl) O-ethyl N-isopropylphosphoroamidothioate. |
| $n$—$C_3H_7O$—, $S$, $i$—$C_3H_7NH$, P—O—(phenyl-$NO_2$)—$CH_3$ (7) | O-(2-nitro-4-methylphenyl) O-n-propyl N-isopropylphosphoroamidothioate. |
| $i$—$C_3H_7O$—, $S$, $i$—$C_3H_7NH$, P—O—(phenyl-$NO_2$)—$CH_3$ (8) | O-(2-nitro-4-methylphenyl) O-isopropyl N-isopropylphosphoroamidothioate. |
| $n$—$CH_9O$—, $S$, $i$—$C_3H_7NH$, P—O—(phenyl-$NO_2$)—$CH_3$ (9) | O-(2-nitro-4-methylphenyl) O-n-butyl N-isopropylphosphoroamidothioate. |

TABLE I—Continued

| Structural formula | Chemical name |
|---|---|
| 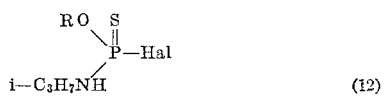 (10) | O-(2-nitro-4-methylphenyl) O-isobutyl N-isopropylphosphoroamidothioate. |
| 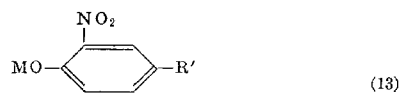 (11) | O-(2-nitro-4-isopropylphenyl) O-ethyl N-isopropylphosphoroamidothioate. |

The invention provides a process for the production of a compound of the Formula 1 in which (a) An O - alkyl - N - isopropylamidothionophosphoric acid ester halide of the formula:

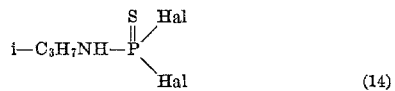 (12)

is reacted with a 2-nitro-4-alkylphenol of the formula:

$$\text{MO}-\underset{\text{NO}_2}{\underset{|}{\bigcirc}}-R' \quad (13)$$

in which
Hal is halogen and
M is hydrogen, an alkali metal or ammonium either in the form of a salt or in the presence of an acid-binding agent; or (b) An N-isopropylamidothionophosphoric acid dihalide of the formula:

$$\text{i-C}_3\text{H}_7\text{NH}-\overset{\text{S}}{\underset{}{\text{P}}}\overset{\text{Hal}}{\underset{\text{Hal}}{}} \quad (14)$$

is reacted with a 2-nitro-4-alkylphenol of the Formula 13, and the product is reacted with an alkali metal alcoholate of the formula:

M'O—R in which
M' is an alkali metal; or (c) An N-isopropylamidothionophosphoric acid dihalide of the Formula 14 is reacted with an alkali metal alcoholate of the Formula 15, and the product is reacted with a 2-nitro-4-alkylphenol of the Formula 13 either in the form of a salt or in the presence of an acid-binding agent.

In Formulae 12 and 14, Hal is preferably chlorine.

Variant (a) is illustrated by the following reaction scheme:

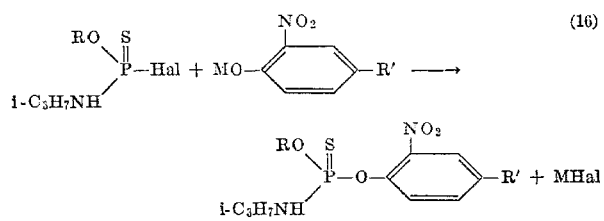

This process is preferably carried out using an inert organic solvent (this term includes a mere diluent). Examples of suitable solvents include aliphatic or aromatic hydrocarbons (which may be halogenated), for example benzine, methylene chloride, chloroform, carbon tetrachloride, benzene, chlorobenzene, toluene, xylene; ethers, for example diethyl ether, dibutyl ether, dioxan, tetrahydrofuran; and aliphatic alcohols or ketones which have low boiling points, for example methanol, ethanol, isopropanol, acetone, methylethyl ketone, methyl isopropyl ketone, methyl isobutyl ketone. Lower aliphatic nitriles, for example acetonitrile, propionitrile, may also be usable.

As already mentioned above, variant (a) may be carried out in the presence of acid-binding agents. For this purpose, alkali metal carbonates, bicarbonates or alcoholates, such as potassium carbonate, sodium bicarbonate, sodium carbonate, or sodium or potassium methylate or ethylate, or aliphatic, aromatic or heterocyclic tertiary bases such as triethylamine, diethylaniline, pyridine, etc. may be used. Instead of reacting in the presence of an acid-binding agent, a salt of the corresponding 2-nitro-4-alkylphenol, preferably an alkali metal or ammonium salt, may be provided and then reacted salt with the O-alkyl N-iso-propyl-amidothionophosphoric acid ester halide. The reaction may be carried out within a fairly wide temperature range, but in general at temperatures of 30° C. to 110° C., preferably 40° C. to 70° C.

In variant (b), one may for example proceed as follows. In one of the inert solvents mentioned above, preferably alcohol, 1 mol of alkali metal or ammonium salt of 2-nitro-4-alkylphenol is dissolved and the solution is added dropwise to 1 mol of N-isopropylamidothionophosphoric acid dihalide and the mixture is heated at 45°–70° C. for a short time. Then the mixture is cooled to room temperature and mixed with 1 mol of alcoholic solution of alkali metal alcoholate. For completing the reaction, the reaction mixture is again heated at 40°–70° C. for a short time and the excess of alcohol is distilled off under reduced pressure. The residue is dissolved in a water-immiscible solvent, preferably one of the aforementioned hydrocarbons or ethers, and the solution is washed with water. Further, after washing with a solution of diluted alkali metal hydroxide or ammonium hydroxide, the organic phase is dried and the solvent is removed by distillation; the final compound is obtained as the residue.

Variant (b) is illustrated by the following reaction schemes:

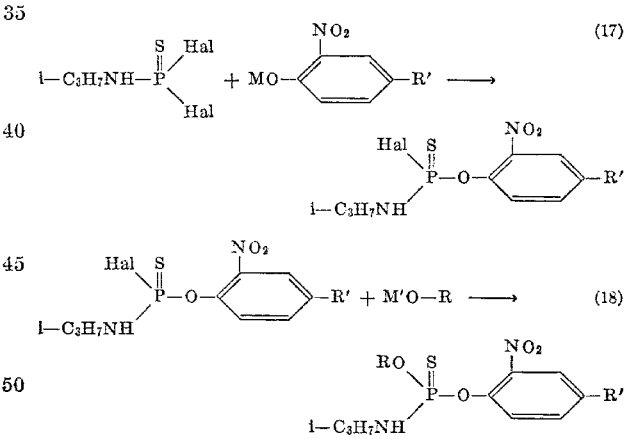

In variant (c) the starting materials are used in a different sequence. N-isopropylamidothionophosphoric acid dihalide is reacted firstly with alkali metal alcoholate solution and then the intermediate product formed is reacted with 2-nitro-4-alkylphenol. When applying this variant of the process, the conditions of the reaction may be the same as those mentioned above.

Variant (c) is illustrated by the following reaction schemes:

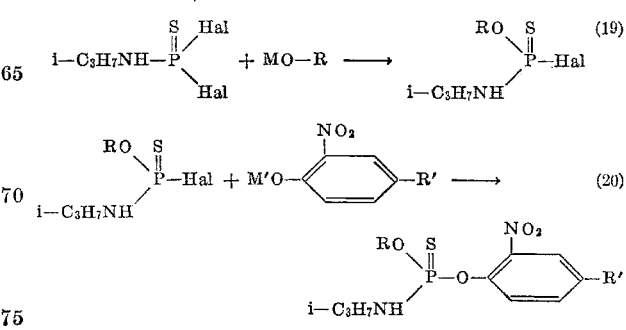

The process for the preparation of a compound according to the invention is illustrated by the following Example I.

EXAMPLE I

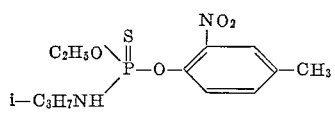

76 g. (0.5 mol.) of 2-nitro-4-methylphenol were dissolved in 400 ml. of acetonitrile and 8.0 g. of dried and sifted potassium carbonate ($K_2CO_3$) were added to the solution. During vigorous stirring, 102 g. (0.5 mol.) of O-ethyl N-iso-propylamidothionophosphoric acid ester chloride were added dropwise at 50° C.–60° C. Next, the mixture was further heated at 60° C. for 3 hours and, after the reaction mixture had cooled to room temperature, it was poured into 400 ml. of ice-water. The precipitated oily matter was dissolved in 300 ml. of benzene and the benzene solution was washed with water several times, and was dried over anhydrous sodium sulphate ($Na_2SO_4$). After distilling off of the solvent, the residue was heated at 60°–70° C. under a pressure of 0.01 mm. Hg for a short time, and the solvent was removed completely. In this way, 127 g. of O-(2-nitro-4-methylphenyl)-O-ethyl N-ethyl N-isopropylphosphoroamidothioate were obtained. If the same operation is carried out using 2-nitro-4-ethylphenol or 2-nitro-4-isopropylphenol in place of 2-nitro-4-methylphenol, O-(2-nitro-4-ethyl-(or iso-propyl)-phenyl) - O - ethyl N - iso-propylphosphoroamidothioate which has the same herbicidal activity is obtained.

It has already been mentioned that the compound of the present invention is distinguished by superior herbicidal properties in comparison with previously known compounds synthesized in an analogous manner and to be used for the same purpose. This outstanding activity is apparently caused by the increase of the general herbicidal potency produced through the introduction of an alkyl radical to give the specific chemical structure.

When applied in larger quantities (5–40 kg. active ingredient per hectare), the composition according to the present invention shows non-selective activity and when used in lower concentrations (1.25–5 kg. per hectare), it shows selective herbicidal activity. For this reason, amidothionophosphoric acid ester of the present invention can be used as germination inhibiting agent, especially as weed controlling agent. The term "weeds" is used in the widest sense to mean all plants that grow where they are not wanted.

The compounds of the present invention show herbicidal activity in the case of, for example, the following plants. They show excellent selective herbicidal efficacy when used in a suitable quantity (for example 1.25–5 kg. per hectare) as mentioned above and especially they can be used as herbicides in upland or paddy fields where the plants in the right hand list below are cultivated.

| Dicotyledonous weeds | Dicotyledonous crops |
|---|---|
| catch weed (Galium) | mustard (Sinapsis) |
| chick weed (Stellaria) | cress (Lepidium) |
| camomile (matricaria) | cotton (Gossypium) |
| French weed (Galinsoga) | sugar beets (Beta) |
| goose-foot (Chenopodium) | carrots (Daucus) |
| stinging nettle (Urtica) | beans (Phaseolus) |
| groundsel (Senecio) | potatoes (Solanum) |
| wild amaranth (Amaranthus) | coffee (Coffea) |
| common purlane (Portulaca) | cabbage (Brassica) |
|  | spinach (Spinacia) |

| Monocotyledonous weeds | Monocotyledonous crops |
|---|---|
| timothy grass (Phleum) | maize (Zea) |
| meadow grass (Poe) | rice (Oryza) |
| fescue grass (Festuca) | oats (Avena) |
| finger grass (Digitaria) | barley (Hordeum) |
| goose-grass (Eleusine) | wheat (Triticum) |
| green foxtail (Setaria) | millet (Panicum) |
| ray grass (Lolium) | sugar cane (Saccharum) |
| barnyard grass (Echinochloa) | |
| brome grass (Bromus) | |

The plant species given in the above enumeration are to be understood as representative examples of the genus designated in Latin. The applicability of the active compounds of the present invention is not limited to these genera, and they may be applied to other plants in the same way.

When the compounds of the present invention are used as herbicides, they may be applied directly diluted with water or in admixture with carriers and formulated into liquids, wettable powders, emulsifiable concentrates, dusts, granules, tablets, pastes, etc. by methods generally employed with the ordinary agricultural chemicals. Examples of solid carriers include inactive mineral materials such as talc, clay, kaolin, montmorillonite, diatomaceus earth, calcium carbonate, etc. Examples of liquid carriers are either solvents or even nonsolvents which can disperse or dissolve the chemicals by means of adjuvants, for example alcohols, benzene, xylene, dimethyl naphthalene, aromatic naphthas, dimethyl formamide, surface active agents, etc.

The efficacy of the active compounds may be assisted by applying them in admixture with such adjuvants used for agricultural chemicals in general as spreaders, emulsifiers, wetting agents, adhesive agents, etc. Further, they can be applied in admixture with other herbicides such as phenoxy compounds, chlorophenol compounds, carbamates, diphenyl ethers or triazine compounds, and also with plant growth regulators, nematocides, soil disinfectants and other agricultural chemicals and fertilizers.

The present invention is further illustrated by the following working examples.

WORKING EXAMPLE 1

5% of the compound of Formula 6 and 95% of a mixture of talc and clay are formulated into a dust by mixing and crushing, and the dust is used by dusting as it is.

WORKING EXAMPLE 2

20% of the compound of Formula 6, 75% of a mixture of Zeeklite and clay, 3% of sodium alkylbenzene sulphonic acid and 2% of sodium dinaphthylmethane disulphonic acid are formulated into a wettable powder by mixing and crushing, and the powder is applied diluted with water.

WORKING EXAMPLE 3

20% of the compopnd of Formula 5, 75% of xylol and 5% of Sorpol (trade name of the product of Toho Kagaku Kogyo K.K., Japan) are formulated into an emulsifiable concentrate by mixing and stirring, and are applied diluted with water.

WORKING EXAMPLE 4

The compound of Formula 8 is dissolved in xylol. The solution is sprayed onto clay granules while rotating and mixing so that about 10% of active ingredient can be incorporated. The granular formation is used as it is by scattering on the surface of soil.

The compositions of the present invention generally contain 0.1–95% by weight, preferably 0.5–90% by weight, of active compound.

The application may be carried out by ordinary methods, for example watering, spraying, atomizing, dusting or scattering. The most suitable application time is before the germination of weeds to be eradicated. Especially when application is carried out mainly before the germination of cultivated plants, the general conditions of cultivation are not so important, but the quantity of active compound to be applied per unit area and the application method are important.

The quantities of the active compound to be used according to this invention may vary within fairly a wide range. They depend upon various factors, for example the condition of cultivation, soil, weeds and weather as well as the purpose of application in each case.

The outstanding herbicidal action of compounds of the present invention as well as their superiority as herbicides compared with previously known compounds is clearly shown by the following test examples.

TEST EXAMPLE A

Test against weeds of paddy fields

Test method.—After filling up pots of 1/5000 with paddy field soil, paddy rise seedlings (Kinmaze variety) at the 3 to 4 leaves stage were transplanted under inundation condition. After the seedlings had taken root, barnyardgrass, seeds of broad-leaved weeds and spikerush were planted. The compounds of the present invention formulated into an emulsifiable concentrate or wettable powder were sprayed in amounts of 500, 250 and 125 g. of active ingredient per 10 a. After 3 weeeks, the herbicidal effect against barnyard grass, spikerush and broad-leaved weeds and phytotoxicity to the paddy rice were investigated.

VALUATION

| Herbicidal efficacy | Phytotoxicity |
| --- | --- |
| 5 Highest efficacy | 5 Highest phytotoxicity |
| 4 Big efficacy | 4 Big phtyotoxicity |
| 3 Medium efficacy | 3 Medium-big phytotoxicity |
| 2 Small efficacy | 2 Medium phytotoxicity |
| 1 Slightest efficacy | 1 Small phytotoxicity |
| 0 No efficacy | 0 No phytotoxicity |

The results are given in Table II.

TABLE II

Test results of herbicidal efficacy against weeds of paddy fields and phytotoxicity to rice

| Compound of formula | Quantity of a.i., g./10 a. | Herbicidal effect Barnyard grass | Spikerush | Broadleaved weeds | Phytotoxicity, rice |
| --- | --- | --- | --- | --- | --- |
| (5) | 500 | 5 | 5 | 5 | 0 |
|     | 250 | 5 | 5 | 5 | 0 |
|     | 125 | 5 | 4 | 5 | 0 |
| (6) | 500 | 5 | 5 | 5 | 0 |
|     | 250 | 5 | 5 | 5 | 0 |
|     | 125 | 5 | 5 | 5 | 0 |
| (7) | 500 | 5 | 5 | 5 | 0 |
|     | 250 | 5 | 3-4 | 5 | 0 |
|     | 125 | 3 | 3 | 4 | 0 |
| (8) | 500 | 5 | 5 | 5 | 0 |
|     | 250 | 5 | 4-5 | 5 | 0 |
|     | 125 | 5 | 3-4 | 4 | 0 |
| (9) | 500 | 5 | 4-5 | 4 | 0 |
|     | 250 | 4 | 3-4 | 4 | 0 |
|     | 125 | 4 | 3 | 3 | 0 |
| (10) | 500 | 5 | 3-4 | 4 | 0 |
|     | 250 | 4 | 3-4 | 4 | 0 |
|     | 125 | 4 | 2 | 2 | 0 |
| PCP (Comparison) | 500 | 5 | 3 | 5 | 0 |
|     | 250 | 3 | 0 | 2 | 0 |
|     | 125 | 1 | 0 | 0 | 0 |
| NIP (Comparison) | 250 | 5 | 5 | 5 | 1 |
|     | 125 | 3 | 1 | 2 | 0 |
| No treatment | | 0 | 0 | 0 | 0 |

Notes.—(1) Broad-leaved weeds are Monochoria, *Rotala indica* Koehne, false pimpernel, *Gratiola Japonica* Miquel, etc. (2) PCP: pentachlorophenol (commercial product). (3) NIP: 2,4-dichlorophenyl-4'-nitrophenyl ether (commercial product).

TEST EXAMPLE B

Test against weeds of upland fields

Test method.—After filling up Pots of 30 x 30 cm. were filled with soil of diluvial volcanic ash and in the pots were sown seeds of the weeds, upland rice (Hataminori variety) and vegetables mentioned in Table III. After covering with soil, the compounds of the present invention, formulated as emulsifiable concentrates or wettable powders were sprayed on the surface of the soil in amounts of 400, 200 and 100 g. of active ingredient per 10 a. After 3 weeks, herbicidal effectiveness against the various weeds and phytotoxicity to the upland rice and various vegetables were investigated.

VALUATION

| Herbicidal efficacy | Phytotoxicity |
| --- | --- |
| 5 Highest efficacy | 5 Highest phytotoxicity |
| 4 Big efficacy | 4 Big phytotoxicity |
| 3 Medium efficacy | 3 Medium-big phytotoxicity |
| 2 Small efficacy | 2 Medium phytotoxiciy |
| 1 Slight efficacy | 1 Small phytotoxicity |
| 0 No efficacy | 0 No phytotoxicity |

The results are given in Table III. (CAT is 2-chloro-4,6-bis (ethylamine)-1,3,5-triazine.)

TABLE III

Test results of herbicidal efficacy against weeds of upland fields and phytotoxicity to various crops

| Compound of formula | Quantity of compound, g./10 a. | Barnyard grass | Finger grass | Dent foxtail | Wild amaranth | Common purslane | Upland rice | Japanese radish | Cucumber | Tomato | Carrots |
| --- | --- | --- | --- | --- | --- | --- | --- | --- | --- | --- | --- |
| (5) | 400 | 5 | 5 | 5 | 5 | 5 | 0 | 0 | 0 | 0 | 0 |
|     | 200 | 5 | 5 | 5 | 5 | 5 | 0 | 0 | 0 | 0 | 0 |
|     | 100 | 5 | 5 | 5 | 5 | 5 | 0 | 0 | 0 | 0 | 0 |
| (6) | 400 | 5 | 5 | 5 | 5 | 5 | 0 | 0 | 0 | 0 | 0 |
|     | 200 | 5 | 5 | 5 | 5 | 5 | 0 | 0 | 0 | 0 | 0 |
|     | 100 | 5 | 5 | 5 | 5 | 5 | 0 | 0 | 0 | 0 | 0 |
| (7) | 400 | 5 | 5 | 5 | 5 | 5 | 1 | 1 | 0 | 0 | 0 |
|     | 200 | 4-5 | 4-5 | 4 | 5 | 5 | 0 | 0 | 0 | 0 | 0 |
|     | 100 | 5 | 3-4 | 3-4 | 5 | 4 | 0 | 0 | 0 | 0 | 0 |
| (8) | 400 | 5 | 5 | 5 | 5 | 5 | 0 | 0 | 0 | 0 | 0 |
|     | 200 | 4-5 | 5 | 5 | 5 | 5 | 0 | 0 | 0 | 0 | 0 |
|     | 100 | 4 | 4 | 3-4 | 5 | 5 | 0 | 0 | 0 | 0 | 0 |
| (9) | 400 | 4-5 | 4-5 | 4 | 5 | 5 | 0 | 0 | 0 | 0 | 0 |
|     | 200 | 3-4 | 3-4 | 3 | 3-4 | 4 | 0 | 0 | 0 | 0 | 0 |
|     | 100 | 2 | 2 | 2 | 3 | 3 | 0 | 0 | 0 | 0 | 0 |
| (11) | 400 | 4-5 | 4-5 | 4 | 5 | 5 | 0 | 0 | 0 | 0 | 0 |
|      | 200 | 4 | 3-4 | 3-4 | 4 | 4 | 0 | 0 | 0 | 0 | 0 |
|      | 100 | 3 | 3 | 3 | 3 | 3 | 0 | 0 | 0 | 0 | 0 |
| CAT (Comparison) | 100 | 5 | 5 | 5 | 5 | 5 | 2 | 3 | 2 | 2 | 2 |
|     | 50 | 4 | 4 | 5 | 5 | 5 | 0 | 1 | 1 | 1 | 1 |
| NIP (Comparison) | 400 | 5 | 5 | 5 | 5 | 5 | 3 | 3 | 5 | 5 | 5 |
|     | 200 | 5 | 5 | 4 | 5 | 5 | 0 | 0 | 2 | 2 | 3 |
| No treatment | | 0 | 0 | 0 | 0 | 0 | 0 | 0 | 0 | 0 | 0 |

TEST EXAMPLE C

Test on pre-emergence soil treatment against various plants

To produce a suitable preparation of active compound, 1 part by weight of active compound is mixed with 5 parts by weight of solvent (acetone) and 1 part by weight of emulsifier (benzyloxypolyglycol ether), and then the emusifier (benzyloxypolyglycol ether), and then the sired concentration.

Seeds of test plants are sown on ordinary soil and after 24 hours the preparation of active compound is sprayed. After 3 weeks, the degree of damage given to the test plants is observed and valued from 0 to 5, as follows:

0 No efficacy
1 Slight damage or slight growth delay
2 Marked damage or growth delay
3 Remarkable damage or only 50% germinated
4 Plants are partially destroyed after germination or only 25% germinated
5 Plants died completely or no germination.

The results are given in Table IV.

TABLE IV
Test on pre-emergence soil treatment against various plants (pot test)

| Compound | Quantity of compound, g./10 a. | Herbicidal efficacy | | | | | | Phytotoxicity | | | | | |
|---|---|---|---|---|---|---|---|---|---|---|---|---|---|
| | | Echino-chloa | Port-ulaca | Cheno-podium | Stellaria | Amaran-thus | Digi-taria | Wheat | Barley | Rice | Cotton | Maize | Cabbage |
| A | 20 | 5 | 5 | 5 | 5 | 4 | 5 | 2-3 | 2-3 | 3 | 2 | 3 | 2-3 |
| | 10 | 5 | 4 | 5 | 5 | 3 | 5 | 1 | 1 | 1 | 1 | 2 | 1 |
| | 5 | 5 | 2 | 5 | 3 | 1 | 5 | 0 | 0 | 0 | 0 | 0 | 0 |
| | 2.5 | 4-5 | 0 | 3-4 | 1 | 0 | 4-5 | 0 | 0 | 0 | 0 | 0 | 0 |
| | 1.25 | 3 | 0 | 3 | 0 | 0 | 3 | 0 | 0 | 0 | 0 | 0 | 0 |
| B | 20 | 5 | 5 | 5 | 5 | 5 | 5 | 4 | 4 | 5 | 4 | 3 | 4-5 |
| | 10 | 5 | 5 | 5 | 5 | 5 | 5 | 1-2 | 2 | 3 | 2 | 3 | 2 |
| | 5 | 5 | 5 | 5 | 5 | 4-5 | 5 | 0 | 0 | 0 | 0 | 0 | 0 |
| | 2.5 | 5 | 4-5 | 4-5 | 4-5 | 3 | 4-5 | 0 | 0 | 0 | 0 | 0 | 0 |
| | 1.25 | 5 | 2 | 2 | 2 | 1 | 3 | 0 | 0 | 0 | 0 | 0 | 0 |
| C | 20 | 5 | 5 | 5 | 5 | 5 | 5 | 5 | 5 | 5 | 5 | 5 | 5 |
| | 10 | 5 | 5 | 5 | 5 | 5 | 5 | 1-2 | 2 | 1-2 | 2 | 2 | 2 |
| | 5 | 5 | 5 | 5 | 5 | 5 | 5 | 0 | 0 | 0 | 0 | 0 | 0 |
| | 2.5 | 5 | 5 | 5 | 5 | 5 | 5 | 0 | 0 | 0 | 0 | 0 | 0 |
| | 1.25 | 5 | 4-5 | 4-5 | 4-5 | 4 | 5 | 0 | 0 | 0 | 0 | 0 | 0 |

NOTE:

(A) 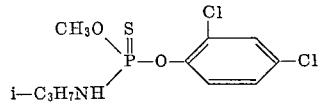

Compound known from U.S. Pat. No. 3,074,790.

(B) 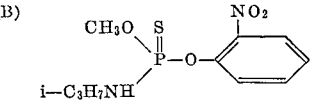

Compound for comparison.

(C) 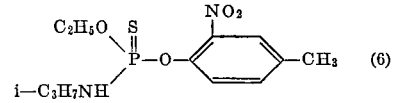 (6)

Compound of the present invention.

The test results given in Table IV show that the compounds of the present invention can have excellent selective herbicidal efficacy without causing any phytotoxicity to cultivated crops when used in a suitable quantity (1.25 kg.–5 kg. active ingredient per hectare). Especially good herbicidal efficacy is shown against barnyard grass (Echinocloa), finger grass (Digitaria), common purslane (Portulaca), etc.

What we claim is:

1. Amidothionophosphoric acid ester of the formula:

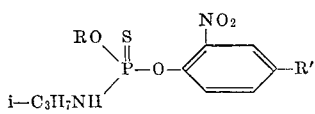

wherein

R and R′ are each an alkyl radical having 1–4 carbon atoms.

2. Compound according to claim 1 in which R′ is a methyl radical.

3. The compound of the formula:

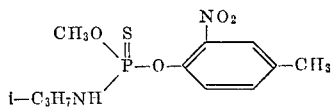

4. The compound of the formula:

[structure with C₂H₅O, S, P, O, NO₂, CH₃, i-C₃H₇NH]

5. The compound of the formula:

[structure with n-C₃H₇O, S, P, O, NO₂, CH₃, i-C₃H₇NH]

6. The compound of the formula:

[structure with i-C₃H₇O, S, P, O, NO₂, CH₃, i-C₃H₇NH]

7. The compound of the formula:

[structure with n-C₄H₉O, S, P, O, NO₂, CH₃, i-C₃H₇NH]

8. The compound of the formua:

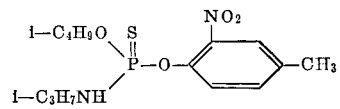

9. The compound of the formula:

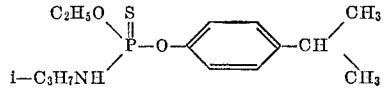

References Cited

UNITED STATES PATENTS 3,472,920  10/1969  Schrader et al. _____ 260—954

CHARLES B. PARKER, Primary Examiner

A. H. SUTTO, Assistant Examiner

U.S. Cl. X.R.

71—87; 260—959, 973

UNITED STATES PATENT OFFICE
CERTIFICATE OF CORRECTION

Patent No. 3,636,143                Dated January 18, 1972

Inventor(s) Gerhard Schrader, Ludwig Eue, Helmuth Hack, Seiichi Hirane, Masahiro Aya, Shigeo Kishino, Nobuo Fukazawa It is certified that error appears in the above-identified patent and that said Letters Patent are hereby corrected as shown below:

Col. 2, last formula

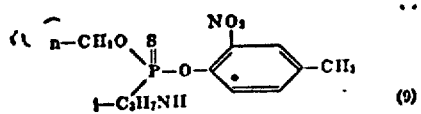    should be    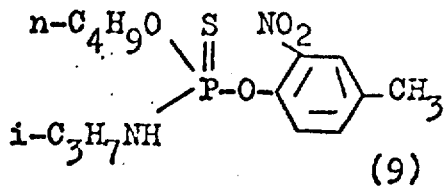

Col. 7, line 42

"slightest"    should be    --slight--

Col. 8, line 49

"slight"    should be    --slightest--

Col. 9, line 9

Delete "emulsifier (benzyloxypolyglycol ether) and then the"

and substitute therefor    --emulsifiable concentrate is diluted with water to the de- --

Signed and sealed this 25th day of July 1972.

(SEAL)
Attest:

EDWARD M. FLETCHER, JR.
Attesting Officer

ROBERT GOTTSCHALK
Commissioner of Patents